Figure 1:
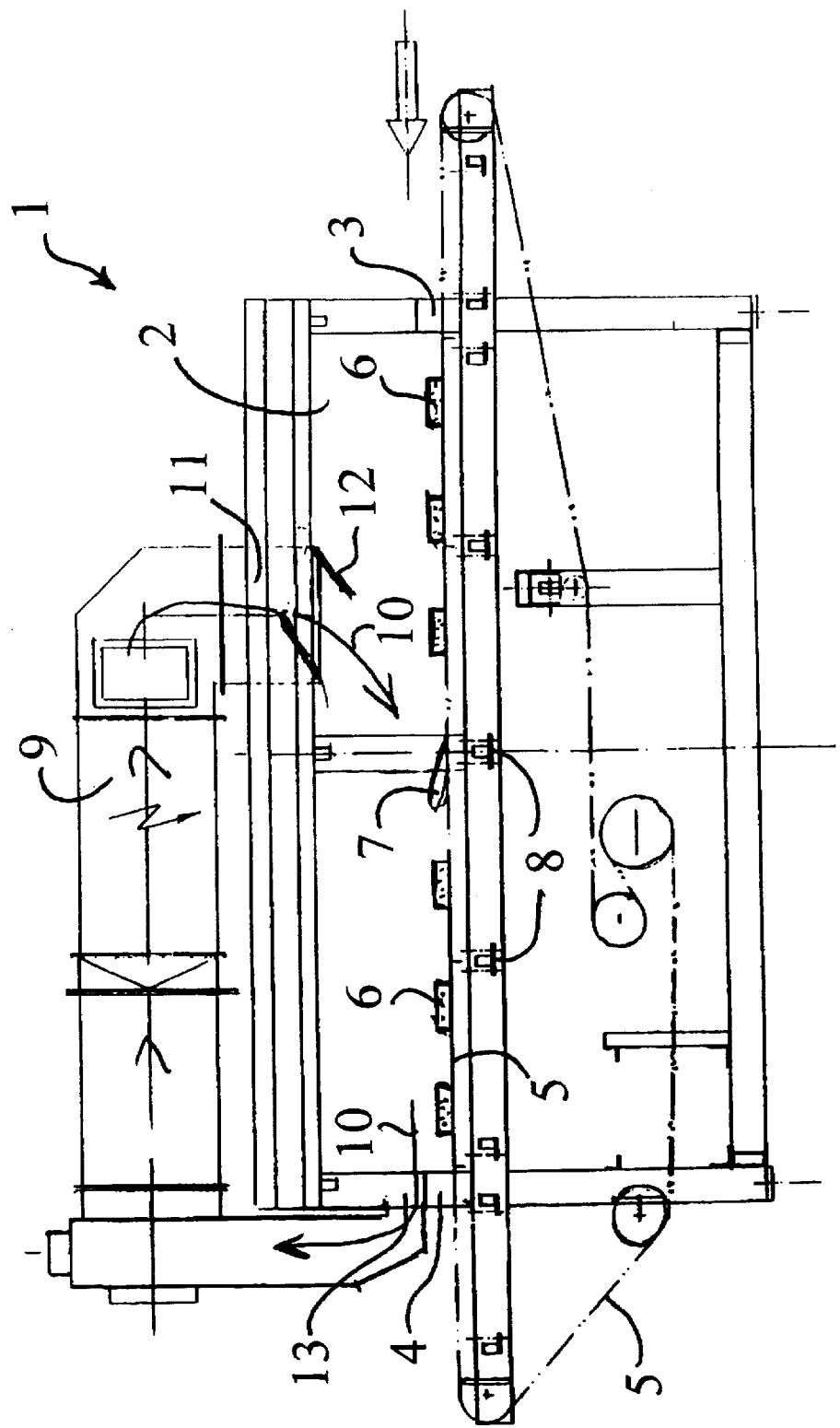

United States Patent
Green et al.

[11] Patent Number: 5,951,895
[45] Date of Patent: Sep. 14, 1999

[54] COOKING PROCESS

[76] Inventors: Winje Green, Persiljevagen 24, Haljarp, Sweden, SE-266 89; Lars Holmlund, Kullagatan 208, Hoganas, Sweden, SE-253 58

[21] Appl. No.: 09/158,007

[22] Filed: Sep. 22, 1998

[51] Int. Cl.⁶ ........................................ F27B 9/06
[52] U.S. Cl. ........................................ 219/388
[58] Field of Search ...................... 219/388, 413, 219/411; 126/19; 99/386, 388; 426/520, 523, 293

[56] References Cited

U.S. PATENT DOCUMENTS

| | | | |
|---|---|---|---|
| 4,245,613 | 1/1981 | Wells et al. | 126/19 |
| 4,389,562 | 6/1983 | Chaudoir | 219/388 |
| 4,620,826 | 11/1986 | Rubio et al. | 414/73 |
| 5,388,503 | 2/1995 | Buerkle | 99/349 |
| 5,588,354 | 12/1996 | Stuck et al. | 99/386 |

FOREIGN PATENT DOCUMENTS

| | | |
|---|---|---|
| 1554638 | 1/1970 | Germany. |
| WO 9616583 | 6/1996 | WIPO. |

*Primary Examiner*—Teresa Walberg
*Assistant Examiner*—Krishan Pasrija
*Attorney, Agent, or Firm*—Laurence R. Brown

[57] ABSTRACT

In a method and a cooking machine for continuously heat treating a food product the heat transfer to the food product is accomplished on a conveyor (5) in a processing chamber (2) from above by means of convection from a heat transfer medium and from below by means of heating means (8) heating the underside of the food product. The heat transfer from below is accomplished by direct contact of the underside of the food product (6) with the conveyor (5), the conveyor being a continuous flat non-perforated belt comprising a plastic material.

9 Claims, 1 Drawing Sheet

COOKING PROCESS

The invention relates to a cooking process and a cooking machine for exercising the process. More specifically, the invention refers to a method for continuously heat treating a food product, the heat transfer to the food product being accomplished on a conveyor in a processing chamber from above by means of convection from a heat transfer medium and from below by means of heat from heating element moving upwards to heat the underside of the food product.

Modern industrial processes using automatic and continuous food cooking machines can in principle be divided into two types of cooking systems. In the first foodstuff is treated with steam and/or hot air on an endless belt. In such a so called hot-air oven different types of belt materials are used and forced hot air as well as steam is added during the cooking process. Thus, such a machine can be used as a simple steam tunnel, superheated steam being used. Alternatively, a combination of steam/hot air is used, whereby for example a steam cooking of the food product is first accomplished and then the product is dried by means of treatment with hot air. Such d Continuous steam cooking system, in which foodstuff is fed on a conveyor belt through continuously replenished saturated steam layer, is for example shown in EP-A-571 937.

Browning of the food products in such a system can be accomplished in different ways. For example, a system for cooking meat products is shown in U.S. Pat. No. 4,737,373, which has a cooker with a humid environment and browning system comprising high velocity hot air. In WO-A-O 88/01719 a conveyor baking oven is shown which uses radiant convection and conduction heating. The conveyor passes through a cooking chamber and gas or electric infra-red radiation sources are used for browning.

U.S. Pat. No. 3,739,712 shows a hamburger cooking system, in which-flat meat patties are continuously roasted as they are carried through the gap between heated platens by a continuously driven endless chain conveyor. In this second type of continuous food cooking machine a grilling or frying of food products is nowadays accomplished by placing them between parallel endless conveyor belts, where they are roasted. In such a contact grill the food product is subjected to trying on both sides at the same time from a surface of high temperature, which it comes into contact with during the conveyance. The two endless belts are usually heated by heating plates being positioned over and under the belts, respectively.

Ovens are also used for cooking which utilize both convection and conduction U.S. Pat. No. 4,299,562 shows an oven which is used for cooking meat patties or pizzas on support means, the upper and lower surface of the food being independently heated. Electrical heating elements are positioned between adjacent rollers to heat the underside of the support means, and a fan draws preheated air from the oven and heats the product further.

In U.S. Pat. No. 5,239,917 an oven is shown for continuous heating of food products on trays for supporting the product. Heating elements are arranged above as well as below the trays with food products, and fans provide heating by radiation and convection. The heat from the lower heating element moves upwards through perforations in the conveyor belt of hooks to heat the trays and the bottoms of the food products.

Many new food products as well as several traditional products are not well suited for contact cooking in a device, in which they are squeezed or compressed between two surfaces. This is especially evident for food products having a structure which will rupture or separate when pressed together between the bands as seen for example with filets of fish. Other products unsuitable for compression are semi viscous products such as omelets, meat balls, and different kinds of gratins. Some of these products also have to be placed on a tray or another kind of support means in order not to be broken during a continuous cooking process on an endless belt.

Endless bands of for example steel are also unsuitable for such food products with direct contact with the belt since they will not come off easily and will then rupture or separate when loosened from the belt. Likewise, such traditional products are—until they are ready—sensitive to irregularities in the belt which results in bumps during the cooking process.

A continuous food cooking machine having two parallel endless belts is very suitable for food products having two parallel surfaces, e.g. hamburgers. However, such a machine is not suitable for products having one flat surface and one irregular surface, e.g. bread, and products of this type are increasing in number.

Further examples of products which are difficult to handle and process in continuous food cooking machines according to the state of the art are different minced meat products, also when formed, slices of meat, and filets of chicken.

The purpose of the invention is to eliminate the problems of existing industrial continuous food cooking processes and cooking machines mentioned above.

A further purpose is to provide an improved process for heat treating food products, while at the same time a great flexibility of processing is achieved with the possibility of cooking many different types of products in a cooking machine according to the invention.

In order to achieve these purposes the invention has obtained the characterizing features of claim 1.

In order to explain the invention in more detail reference is made to the accompanying drawing in which FIG. 1 schematically shows a cross section through a cooking machine according to the invention.

A cooking machine 1 comprises an elongated processing path within a housing or processing chamber 2 having an entrance 3 and an exit 4. The processing path preferably consists of a conveyor, for example an endless belt 5. According to the invention the conveyor exposes a continuous flat non-perforated surface to the different food products to be processed.

The food products 6 to be processed are placed as discrete pieces on the endless belt 5 and are continuously transported by means of a motor through the processing chamber 2 during the heat treatment of the food product. One or more turning devices 7 can be arranged in the processing path of the endless belt 5, so that the food products 6 can be turned over one or several times Furthermore, the velocity of the endless belt 5 can be varied during a process of cooking or cooling.

The endless belt or cooking bond 5 is made of a material which can withstand the heat, humidity and other variables to which it will be subjected in the machine according to the invention. Suitable materials are plastics of fluorocarbons, which include polytetrafluoroethylene (PTFE), polychlorotrifluoroethylene (PCTFE), polyvinylidene, and fluorinated ethylene propylene (FEP)

The endless belt 5 can be designed impermeable as well as in the formula fabric or a web. Preferably, a cooking belt is used which is dense and can withstand a temperature of about −70° C.

In order to be able to withstand the strains in a cooking machine the endless band of plastic material is reinforced. The belt can be reinforced with glass fibers, a stainless steel mesh or reinforcing fibers of synthetic polymers, e.q. poly-p-phenylene terephtalamide which is commercially available as Kevlar®. This is a very strong thermoplastic polymer which is virtually immune to chemical attack and which may be used over a very wide temperature range. Thus, in order to obtain the same cooking effect as with a belt reinforced with glass fibre a thinner belt of poly-p phenylene terephtalamide can be used. This is an important aspect of the invention since the heat transfer from the conveyor to the food product should be as efficient as possible.

In addition, by reinforcing the plastic material food products containing bonco can be used which otherwise would be unsuitable since they can damage the belt material. Such products are for example pork chop whole and half chickens, chicken legs etc.

By manufacturing the cooking band 5 in a material which is impermeable to solid as well as liquid materials it is possible to collect residues and by-products of the cooking process, e.g. fat. Such substances are then easily removed from the cooking machine which thus is very easy to clean.

Heating plates 8 are arranged under the endless bolt 5 and can be heated electrically, with a combustible gas, or by means of a heal transfer oil. The temperature of each heating plate can also be adjusted individually.

According to one aspect of the invention the cooking is accomplished on one side of the food product. Thus, heat is provided by means of thermal conduction from the underside of the food products 6 via direct contact with the endless belt.

On top of the processing chamber 2 a fan installation 9 is arranged, from which a stream 10 of a heat transfer medium is forced into the process chamber 2 through one or more inlets 11 by means of one or several fans.

The heat transfer medium can comprise air, steam, or mixtures thereof. Accordingly, the installation 9 is provided with means (not shown) for the supply thereto ot steam and/or superheated steam. In addition, the temperature of the heat transfer medium is adjustable by means of heating and cooling devices (not shown) in the installation 9. The heat is thus transferred by means of convection to the upper side of the food products 9

Baffles 12 are arranged in the inlet 11 for guiding the stream 10 of heat transfer medium to different places in the processing chamber 2 and in different directions down towards the endless belt 5 with the food products to be treated thereon so that a suitably directed stream 10 is obtained. The supply velocity of the heat transfer medium to the process chamber can also be adjusted by changing the fan speed in the installation 9. Thus, the heat transfer medium can be supplied to different parts of the professing chamber 2 at different velocities and/or in different amounts. The stream 10 of heat transfer medium can be returned to the fan illustration 9 via an outlet 13. Means can also be provided for detecting and regulating the moisture content of the process atmosphere within the housing 2.

In another embodiment of the invention (not shown) a further endless belt is arranged above the cooking band in the processing path, both belts having the same velocity The upper belt is preferably a mesh belt, e.g. of steel wire, and acts by pressing suitable food products down against the cooking band, the contact between the food product and the heated cooking band being increased and thus also the heat transfer by means of conduction. An effective heat transfer to the upper side of the food product by means of convection can still be obtained by the mesh belt being pervious to the heat transfer medium. By heating the upper mesh belt of the conveyor a contact cooking effect in the form of for example grill marks can at the same time be accomplished on the upper side of the food products The amount ot different food products treated in continuous food cooking processes are increasing. Thus, there exist products which would obtain better properties if they were subjected to direct contact cooking from below in combination with a treatment with hot air/steam from above. Further examples of such products are bread, pizza, and liver paste.

The heat transfer to the food product on a conveyor is according to the invention accomplished from the bottom by means of conduction from the conveyor directly to the food product and from the top by means of convection from a heat transfer medium. Accordingly, in the convection the heat transfer between the aqueous food product and the heat transfer medium involves movement of the medium itself.

Different kinds of heat transfer media can be used in the cooking machine according to the invention in order to accomplish the convection. Thus, the heat transfer medium comprises steam only, superheated steam, hot air only, and combinations of hot air and steam. Furthermore, the heat transfer medium can be circulated to different parts of the processing chamber at different velocities and/or different amounts and applied to the food products in different ways with different velocities of product movement. If necessary, the food products can be turned over during the cooking procedure so that both sides are subjected to direct contact cooking. This is especially important for very soft products.

The cooking process can also be operated in different steps by for example concentrating the steam to the early stage of the cooking process, i.e. near the entrance 3, and the hot air to the late stage of the process, i.e. near the exit 4. In this way a coagulation and a desiccation effect, respectively, is obtained at different sites of the processing path.

By this kind of process a great flexibility of cooking foodstuff is achieved, i.e. many different types of products can be cooked. In principle, there are no limits for the kind of products which can be treated according to the method of the present invention. All foodstuffs are suitable and includes for example cereals, vegetable products, meat and fish, poultry, mixed meat products etc.

The method for continuously heat treating a food product is not only suitable for heat treating a food product by means of cooking. Also deep freezed foodstuffs are surprisingly well suited to be thawed according to the method of the invention. For example, shrimps have been thawed with excellent results.

We claim:

1. Method for continuously heat treating a food product (6), comprising the steps of:

heat transfer to the food product carried on a conveyor belt (5) through a processing chamber (2) from above by means of forced convection from a gaseous heat transfer medium and heat transfer to the food product from below the belt by heating means (8) heating the underside of the food product (6), by direct contact of the underside of the food product (6) with a heated conveyor (5), presenting a continuous flat non-perforated belt of a plastic material.

2. Method as claimed in claim 1, characterized in that the heat treatment of the food product is cooking.

3. Method as claimed in claim 1, characterized in that the heat treatment of the food product is thawing.

4. Method as claimed in claim 1, characterized in that the food product (6) is turned over in the processing chamber (2) during the heat treatment.

5. A cooking machine (1) combination comprising an installation (9) forcing a gaseous stream (10) of a heat transfer medium through at least one inlet (11) into a processing chamber (2) for continuous heat treatment of a food product (6) from above and further comprising a movable conveyor belt heated with heating means (8) underneath, said conveyor (5) being a continuous flat non-perforated belt of a plastic material.

6. A cooking machine as claimed in claim 5, wherein the belt further comprises a fabric reinforced with poly-p-phenylene terephtalamide.

7. A cooking machine as claimed in claim 5, characterized in that the plastic material is selected from the group comprising polytetrafluoroethylene, polychlorotrifluoroethylene, polyvinylidene, and fluorinated ethylene propylene.

8. A cooking machine as claimed in claim 5, characterized in that the temperature of each heating means (8) is individually adjustable.

9. A cooking machine as claimed in claim 5, further comprising means for adjusting the velocity of the conveyor belt (5).

* * * * *